US011416170B2

(12) United States Patent
Khan et al.

(10) Patent No.: US 11,416,170 B2
(45) Date of Patent: Aug. 16, 2022

(54) TECHNOLOGIES FOR EFFICIENTLY ACCESSING DATA COLUMNS AND ROWS IN A MEMORY

(71) Applicant: Intel Corporation, Santa Clara, CA (US)

(72) Inventors: Jawad B. Khan, Portland, OR (US); Richard Coulson, Portland, OR (US)

(73) Assignee: Intel Corporation, Santa Clara, CA (US)

(*) Notice: Subject to any disclaimer, the term of this patent is extended or adjusted under 35 U.S.C. 154(b) by 356 days.

(21) Appl. No.: 16/249,964

(22) Filed: Jan. 17, 2019

(65) Prior Publication Data

US 2019/0146717 A1 May 16, 2019

(51) Int. Cl.
*G06F 3/06* (2006.01)
*G06F 12/06* (2006.01)
*G06F 12/02* (2006.01)

(52) U.S. Cl.
CPC .......... *G06F 3/0659* (2013.01); *G06F 3/0604* (2013.01); *G06F 3/0673* (2013.01); *G06F 12/0246* (2013.01); *G06F 12/0646* (2013.01); *G06F 2212/1041* (2013.01)

(58) Field of Classification Search
CPC ......... G06F 3/06–0689; G06F 12/0646; G06F 2212/1041; G06F 3/0659; G06F 3/0604; G06F 3/0673; G06F 12/0246
See application file for complete search history.

(56) References Cited

U.S. PATENT DOCUMENTS

| 4,983,958 A | * | 1/1991 | Carrick | .................. | G09G 3/003 345/520 |
| 2016/0188230 A1 | * | 6/2016 | Blaettler | ............... | G06F 3/0619 711/162 |
| 2018/0039416 A1 | * | 2/2018 | Ware | ................... | G11C 11/4097 |
| 2019/0171576 A1 | * | 6/2019 | Malshe | ................. | G06F 12/023 |

* cited by examiner

*Primary Examiner* — Nicholas J Simonetti
(74) *Attorney, Agent, or Firm* — Compass IP Law PC

(57) ABSTRACT

Technologies for efficiently accessing data columns and rows in a memory include a device with circuitry configured to receive a request to access memory in which each bit of a logical column of bits is located in a different physical row and a different physical column than any other bit in the logical column. The circuitry is additionally configured to access, in response to the request, the memory. In accessing the memory, the circuitry rotates one or more bit positions in a data set read from or written to the memory.

18 Claims, 11 Drawing Sheets

TECHNOLOGIES FOR EFFICIENTLY ACCESSING DATA COLUMNS AND ROWS IN A MEMORY

BACKGROUND

In many compute operations, such as matrix operations (e.g., matrix multiplication), data is manipulated by a compute device in rows and columns. Two formats for storing matrix data in memory are row-major format and column-major format. In row-major format, consecutive elements of the rows of the matrix are contiguous in memory. Conversely, in column-major format, consecutive elements of the columns are contiguous. Performing a matrix multiplication involves reading a given matrix in row-major format, reading another matrix in column-major format, and multiplying the respective rows and columns with one another. Often, the memory may store matrices in either row-major or column-major format and convert the matrix as needed during an operation. However, doing so increases latency and computational cost. As an alternative, a matrix may be stored in both row-major and column-major formats, but doing so increases memory usage.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 7 is a simplified diagram of logical and physical layouts of data that may be utilized by the compute device of FIG. 1;

DETAILED DESCRIPTION OF THE DRAWINGS

Figure 1:
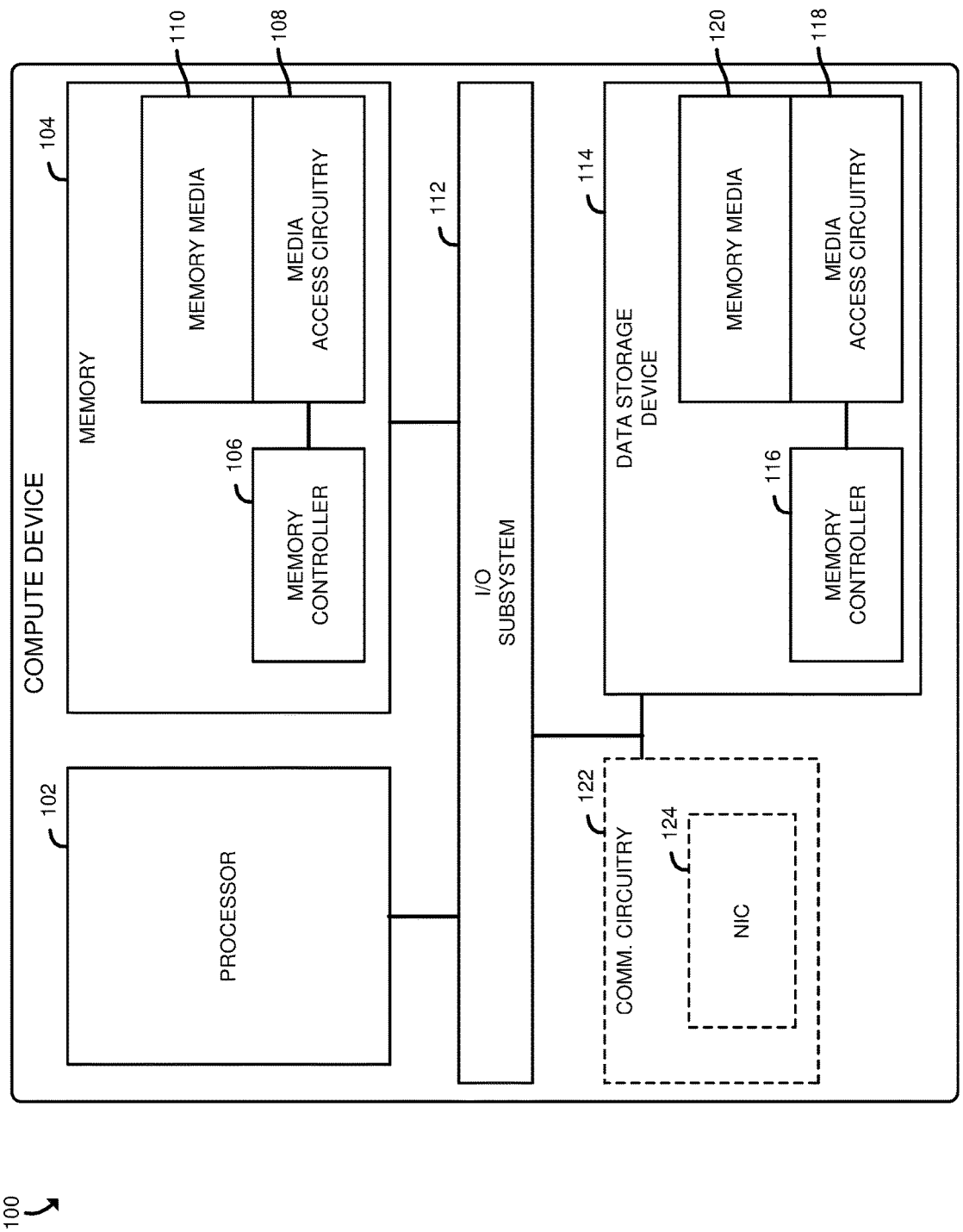
FIG. 1 is a simplified diagram of at least one embodiment of a compute device for performing efficient access of columns and rows of data in a memory.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a compute device 100 for performing efficient access of columns and rows of data in a memory includes a processor 102, memory 104, an input/output (I/O) subsystem 110, a data storage device 114, and communication circuitry 122. Of course, in other embodiments, the compute device 100 may include other or additional components, such as those commonly found in a computer (e.g., a display, peripheral devices, etc.). Additionally, in some embodiments, one or more of the illustrative components may be incorporated in, or otherwise form a portion of, another component. As described herein, the compute device 100, and in particular, the memory of the compute device 100 provides efficient access to selected rows and/or columns of data in the memory (e.g., writing to only the data within a specified column of a matrix, reading from only the data within the specified column, etc.) and does so using a particular distribution of the data from each logical row and logical column (e.g., rows and columns of a multi-dimensional matrix of data) across a physical cross point architecture of the memory to reduce the effects of latency caused by a cool-down period that prevents the same section of the memory media from being accessed in immediate succession and to simplify the mathematical operations involved in reconstructing the data into the logical rows and columns (e.g., for use by an application executed by the compute device 100).

The processor 102 may be embodied as any device or circuitry (e.g., a multi-core processor(s), a microcontroller, or other processor or processing/controlling circuit) capable of executing a workload (e.g., a set of operations, such as an application that may produce requests to read from and/or write to sections of memory, such as selected columns and/or rows of data in a matrix) and/or performing other operations described herein. In some embodiments, the processor 102 may be embodied as, include, or be coupled to an FPGA, an application specific integrated circuit (ASIC), reconfigurable hardware or hardware circuitry, or other specialized hardware to facilitate performance of the functions described herein.

Figure 2:
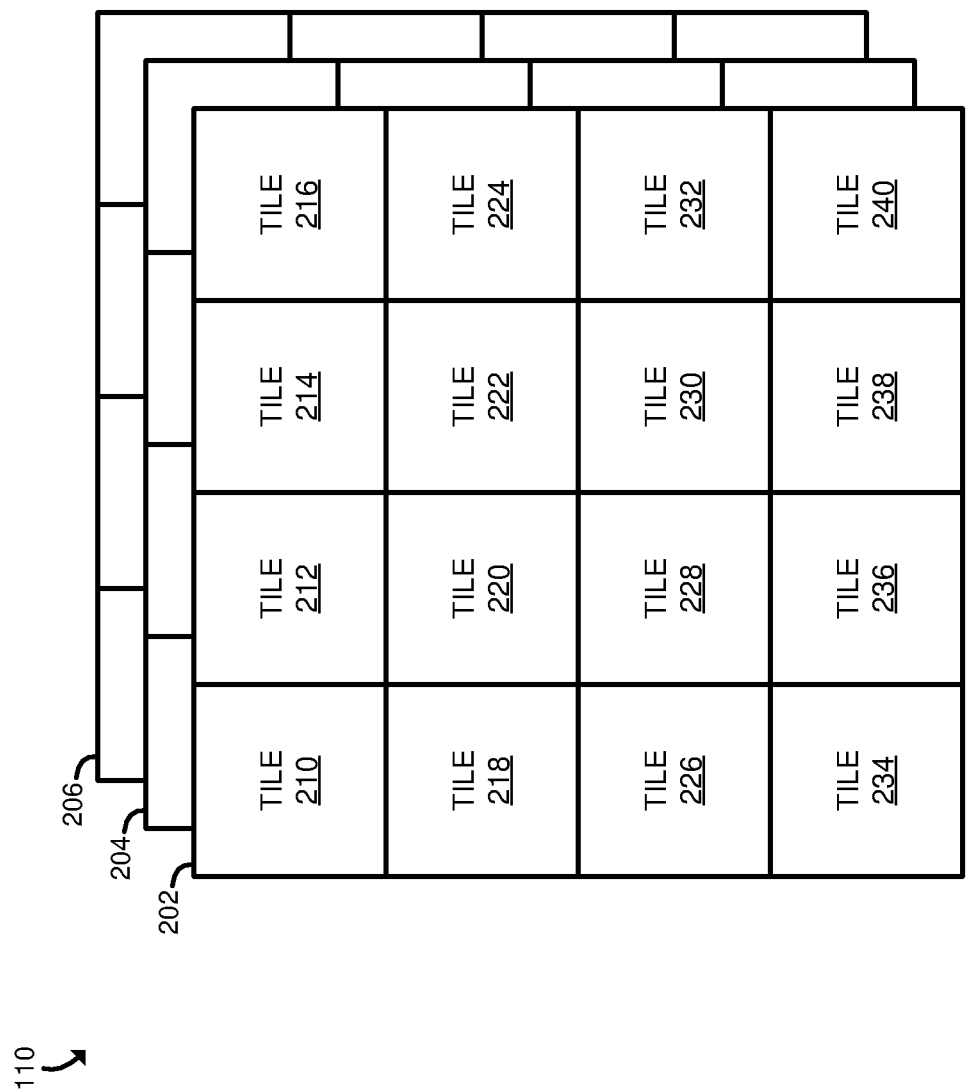
FIG. 2 is a simplified diagram of at least one embodiment of a memory media included in the compute device of FIG. 1.

The memory 104, which may include a non-volatile memory (e.g., a far memory in a two-level memory scheme), includes a memory media 110 and media access circuitry 108 (e.g., a device or circuitry, such as integrated circuitry constructed from complementary metal-oxide-semiconductors (CMOS) or other materials) underneath the memory media 110. The media access circuitry 108 is also connected to a memory controller 106, which may be embodied as any device or circuitry (e.g., a processor, a co-processor, dedicated circuitry, etc.) configured to selectively read from and/or write to the memory media 110 (e.g., in response to requests from the processor 102, which may be executing an application seeking to read from or write to the memory media 110). Referring briefly to FIG. 2, the memory media 110, in the illustrative embodiment, includes a set of tiles 210, 212, 214, 216, 218, 220, 222, 224, 226, 228, 230, 232, 234, 236, 238, 240 (e.g., each an addressable section of the memory media 110 capable of retaining data) arranged in a cross point architecture (e.g., an architecture in which memory cells sit at the intersection of word lines and bit lines and are individually addressable and in which bit storage is based on a change in bulk resistance), in which each tile is addressable by an x parameter and a y parameter (e.g., a column and a row). A set of tiles form a partition and multiple partitions may be stacked as layers 202, 204, 206 to form a three-dimensional cross point architecture (e.g., Intel 3D XPoint™ memory). Unlike typical memory devices, in which only fixed-size multiple-bit data structures (e.g., byte, words, etc.) are addressable, the media access circuitry 108 is configured to read individual bits, or other units of data, from the memory media 110 at the request of the memory controller 106, which may produce the request in response to receiving a corresponding request from the processor 102.

In the illustrative embodiment, the media access circuitry 108 defines logical rows and logical columns in which, in a given logical column (e.g., a column of a multi-dimensional matrix of data), each bit is in a different physical row and physical column than any other bit in that logical column. By arranging the data of the logical columns as described herein, the compute device 100 may perform memory accesses (e.g., writes and/or reads) that avoid a latency that would otherwise occur as the memory media 110 performs a physical state change (e.g., a cool-down process) at the physical row and column that was just accessed, before the next bit of data within that same row and/or column is accessible. Further, to provide additional efficiency in terms of manufacturing cost and physical die size (e.g., number of logic gates), in the illustrative embodiment, the logical columns are arranged diagonally across the physical rows and columns. Arranging each logical column diagonally simplifies the mathematical operations involved in addressing the underlying physical tiles (e.g., using rotation and modulus operators), as compared to other patterns of distributing the bits in a given logical column across the underlying physical rows and columns.

The memory 104 may include non-volatile memory and volatile memory. The non-volatile memory may be embodied as any type of data storage capable of storing data in a persistent manner (even if power is interrupted to the non-volatile memory). For example, the non-volatile memory may be embodied as one or more non-volatile memory devices. The non-volatile memory devices may include one or more memory devices configured in a cross-point architecture that enables bit-level addressability (e.g., the ability to read from and/or write to individual bits of data, rather than bytes or other larger units of data), and are illustratively embodied as three-dimensional (3D) crosspoint memory. In some embodiments, the non-volatile memory may additionally include other types of memory, including any combination of memory devices that use chalcogenide phase change material (e.g., chalcogenide glass), ferroelectric transistor random-access memory (FeTRAM), nanowire-based non-volatile memory, phase change memory (PCM), memory that incorporates memristor technology, Magnetoresistive random-access memory (MRAM) or Spin Transfer Torque (STT)-MRAM. The volatile memory may be embodied as any type of data storage capable of storing data while power is supplied volatile memory. For example, the volatile memory may be embodied as one or more volatile memory devices, and is periodically referred to hereinafter as volatile memory with the understanding that the volatile memory may be embodied as other types of non-persistent data storage in other embodiments. The volatile memory may have an architecture that enables bit-level addressability, similar to the architecture described above.

The processor 102 and the memory 104 are communicatively coupled to other components of the compute device 100 via the I/O subsystem 112, which may be embodied as circuitry and/or components to facilitate input/output operations with the processor 102 and/or the main memory 104 and other components of the compute device 100. For example, the I/O subsystem 112 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 112 may form a portion of a system-on-a-chip (SoC) and be incorporated, along with one or more of the processor 102, the main memory 104, and other components of the compute device 100, in a single chip.

The data storage device 114, may be embodied as any type of device configured for short-term or long-term storage of data such as, for example, memory devices and circuits, memory cards, hard disk drives, solid-state drives, or other data storage device. In the illustrative embodiment, the data storage device 114 includes a memory controller 116, similar to the memory controller 106, media access circuitry 118, similar to the media access circuitry 108, and memory media 120, similar to the memory media 110. As such, in the illustrative embodiment, the data storage device 114 is capable of efficiently accessing (e.g., reading and/or writing to) selected rows and columns of data (e.g., in a multi-dimensional matrix) in the memory media 120. That is, similar to the memory media 110 of the memory 104, the memory media 120 of the data storage device 114 may also be column-addressable. The data storage device 114 may include a system partition that stores data and firmware code for the data storage device 114 and one or more operating system partitions that store data files and executables for operating systems.

The communication circuitry 122 may be embodied as any communication circuit, device, or collection thereof, capable of enabling communications over a network between the compute device 100 and another device. The communication circuitry 122 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 122 includes a network interface controller (NIC) 122, which may also be referred to as a host fabric interface (HFI). The NIC 124 may be embodied as one or more add-in-boards, daughter cards, network interface cards, controller chips, chipsets, or other devices that may be used by the compute device 100 to connect with another compute device. In some embodiments, the NIC 124 may be embodied as part of a system-on-a-chip (SoC) that includes one or more processors, or included on a multichip package that also contains one or more processors. In some embodiments, the NIC 124 may include a local processor (not shown) and/or a local memory (not shown) that are both local to the NIC 124. In such embodiments, the local processor of the NIC 124 may be capable of performing one or more of the functions of the processor 102. Additionally or alternatively, in such embodiments, the local memory of the NIC 124 may be integrated into one or more components of the compute device 100 at the board level, socket level, chip level, and/or other levels.

Figure 3:
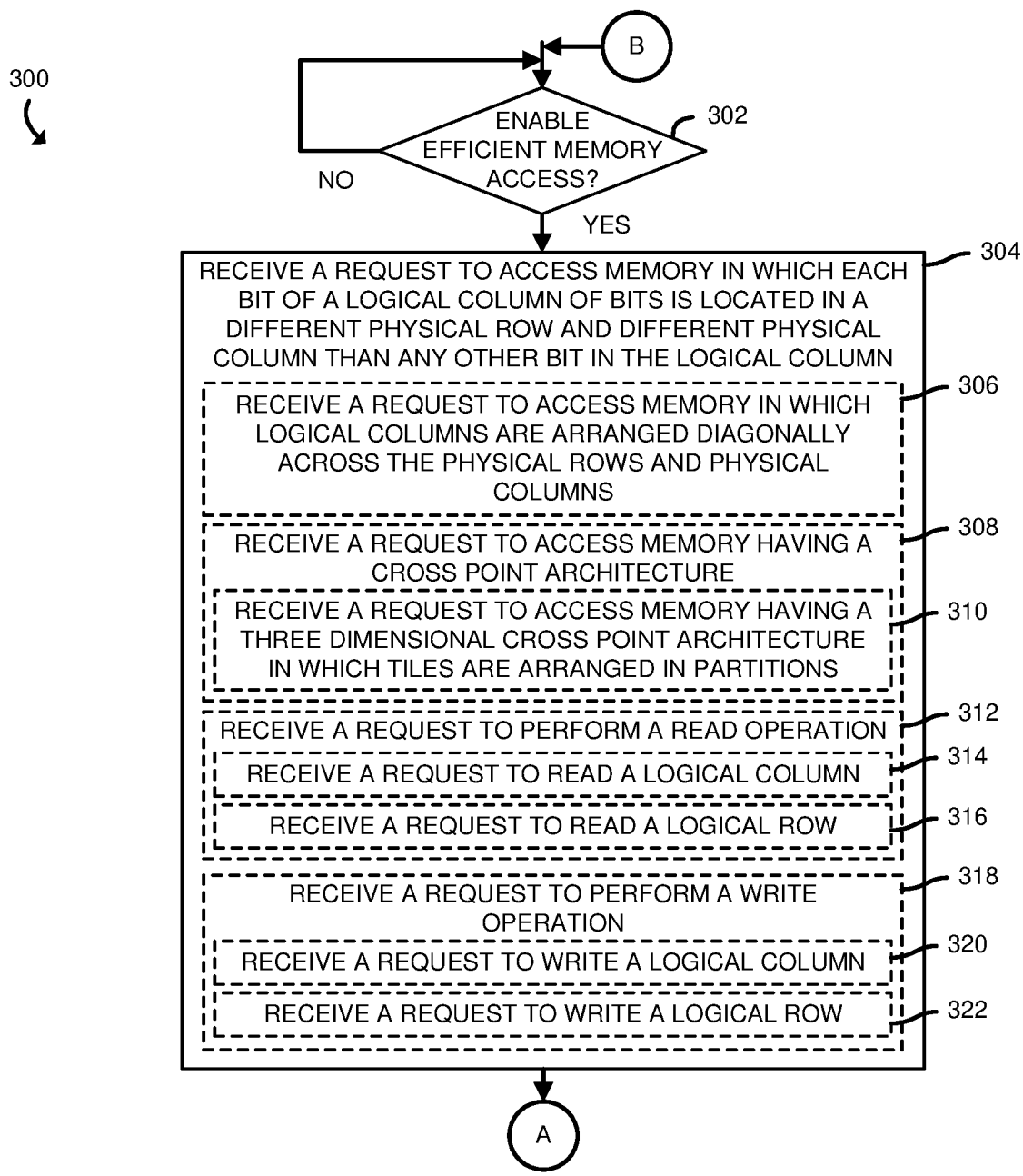
FIGS. 3-5 are a simplified diagram of at least one embodiment of a method for providing efficient access of columns and rows of data in a memory that may be performed by the compute device of FIG. 1.
Figure 4:
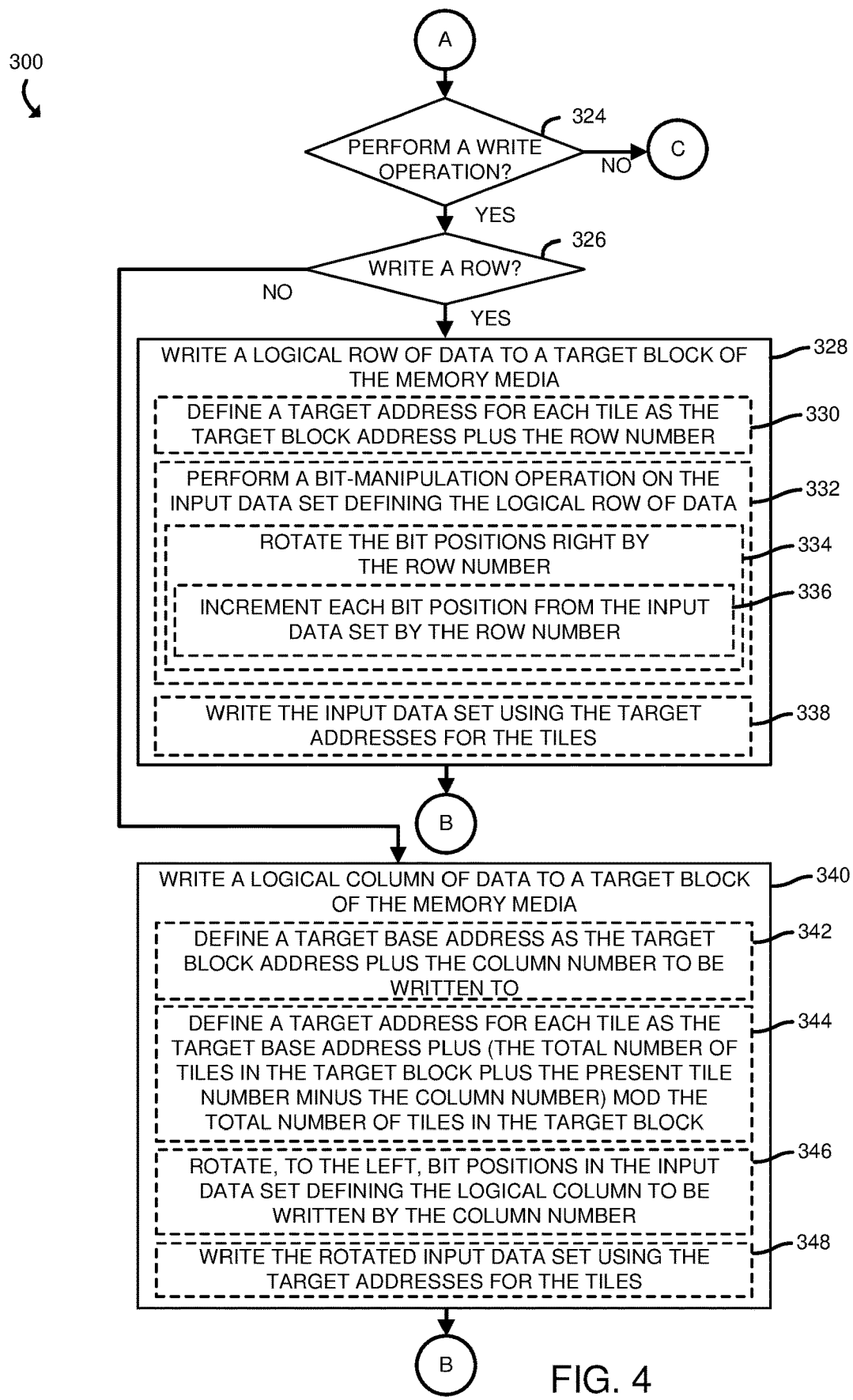
Figure 6:
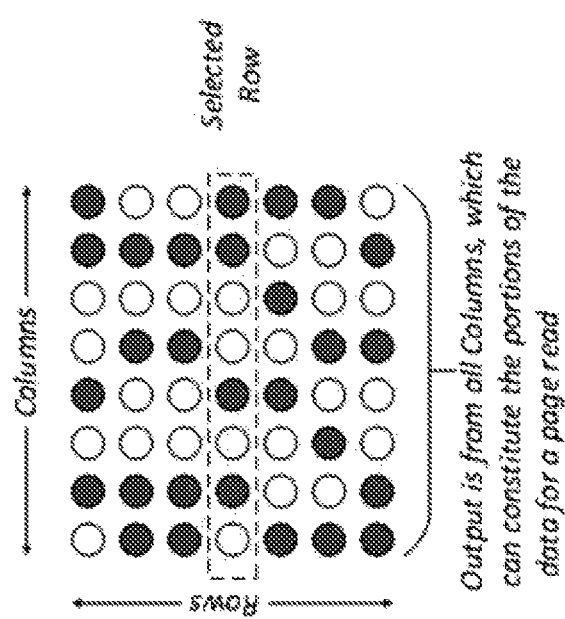
FIG. 6 is a simplified diagram of rows and columns of data that may be selectively accessed by the compute device of FIG. 1.
Figure 6:
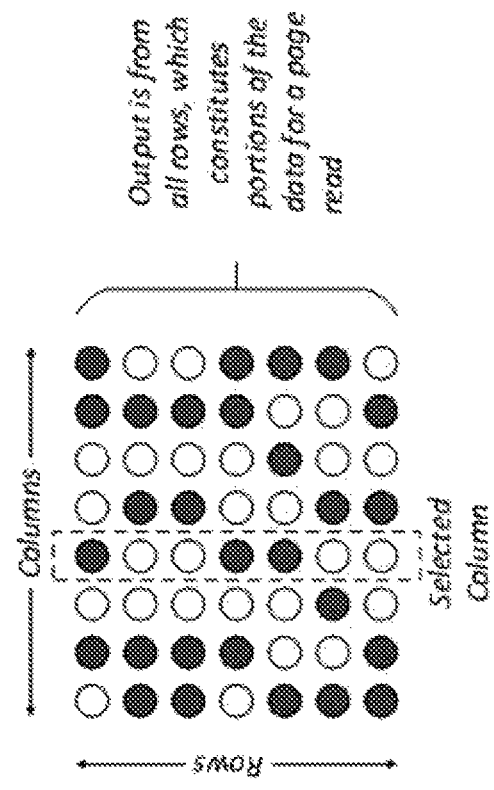
Figure 7:
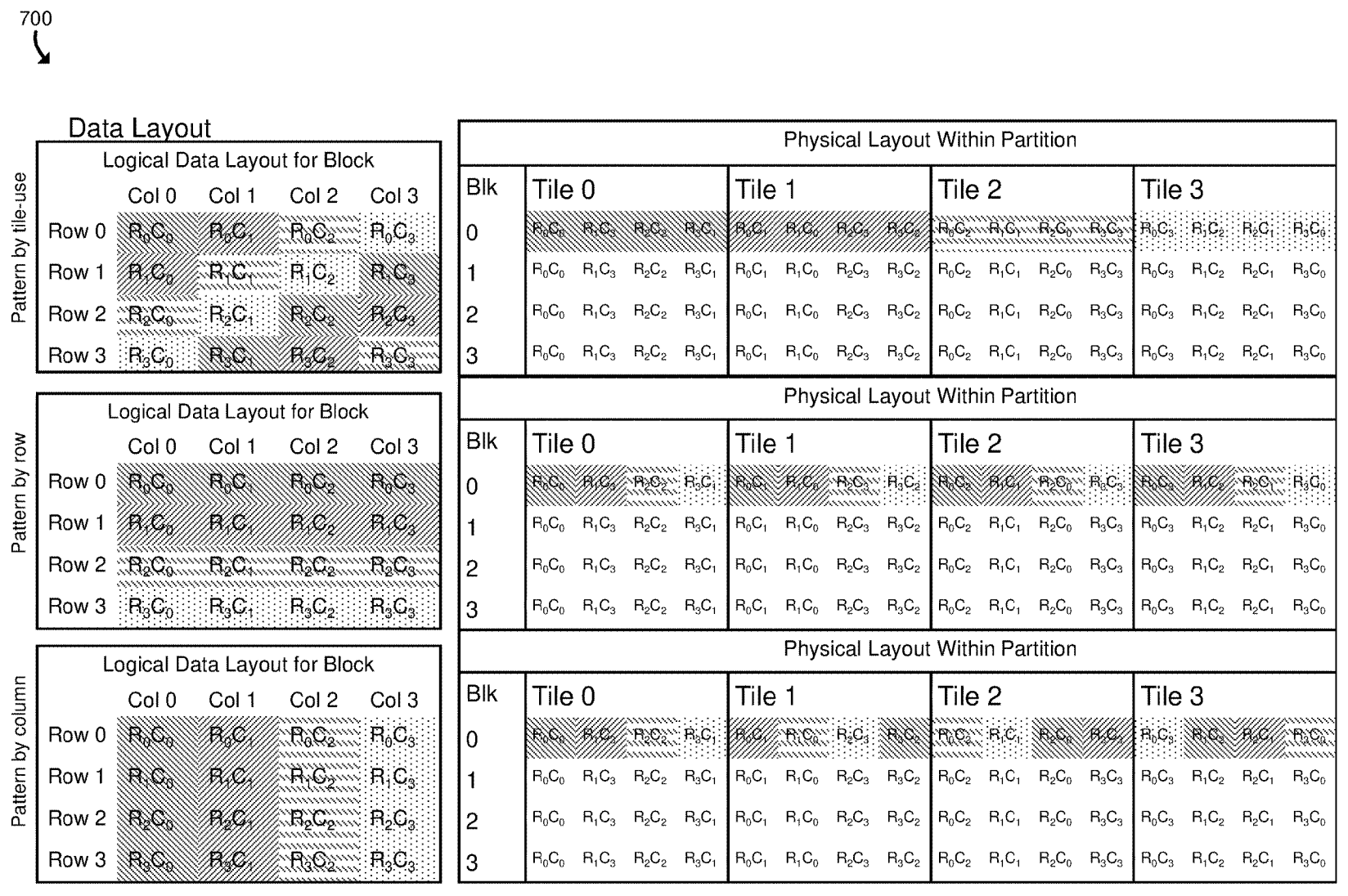

Referring now to FIG. 3, the compute device 100, in operation, may execute a method 300 for providing efficient access of columns and rows of data in a memory. The method 300 is described with reference to the memory 104. However, it should be understood that the method 300 could be additionally or alternatively performed using the memory of the data storage device 114. The method 300 begins with block 302, in which the compute device 100 determines whether to enable efficient memory access (e.g., whether to perform the operations of the method 300). In making the determination, the compute device 100 may determine whether the media access circuitry 108 is configured to perform efficient memory access (e.g., based on querying the memory controller 106 as to whether the media access circuitry 108 is configured to perform efficient memory access), in response to a request from the processor 102 (e.g., by an application executed by the processor 102) to enable efficient memory access, and/or based on other factors. Regardless, in response to a determination to enable efficient memory access, the method 300 advances to block 304 in which the compute device 100 receives a request (e.g., a request produced by an application executed by the processor 102) to access memory in which each bit of a logical column of bits is located in a different physical row and different physical column than any other bit in the logical column (e.g., the memory 104). That is, the request may be a request produced by an application executed by the processor 102 or from another source, to read or write data, and given that the compute device 100 is configured to enable efficient memory access, the request is interpreted by the compute device 100 (e.g., by the processor 102 and the memory controller 106) as a request to access memory in which each bit of a logical column of bits is located in a different physical row and different physical column than any other bit in the logical column. As indicated in block 306, in the illustrative embodiment, the request is to access memory in which logical columns are arranged diagonally across the physical rows and columns of the memory media (e.g., the memory media 110). Referring briefly to FIG. 6, a diagram 600 of a matrix of data including multiple rows and multiple columns of data, in which particular rows and/or columns may be selected for access (e.g., read and/or write) is shown. Further, and referring to FIG. 7, a diagram 700 of logical and physical layouts of data within the memory media 110 are shown.

Figure 8:
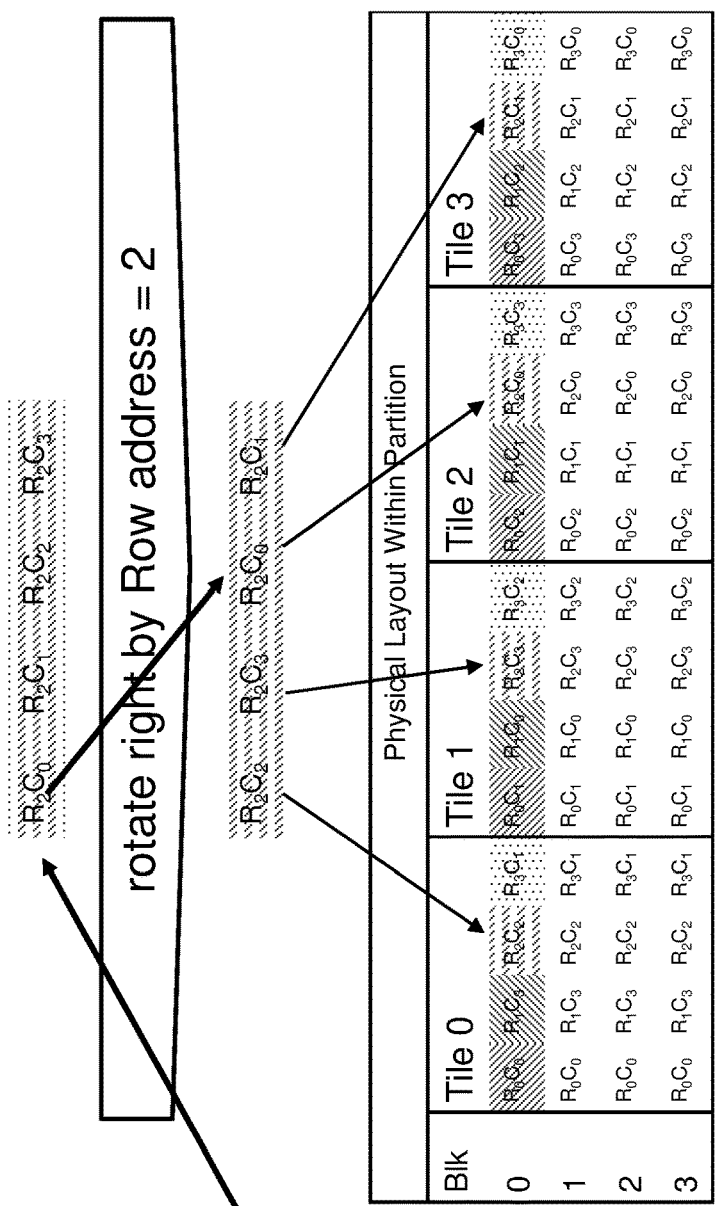
FIG. 8 is simplified diagram of a rearrangement of data from a logical layout to a physical layout that may be performed by the compute device of FIG. 1 when writing a logical row of data.

Still referring to FIG. 3, in receiving the request, the compute device 100 may receive a request to access memory having a cross point architecture (e.g., an architecture in which memory cells are positioned at the intersection of word lines and bit lines and are individually addressable, such as with column and row addresses (e.g., x and y addresses)), as indicated in block 308. Further, in the illustrative embodiment, the request may be to access memory having a three dimensional cross point architecture (e.g., Intel 3D XPoint™ memory) in which tiles are arranged in partitions, as indicated in block 310. As indicated in block 312, the request may be a request to perform a read operation. Further, and as indicated in block 314, the request may be to read a logical column of data. Alternatively, the request may be to read a logical row of data, as indicated in block 316. As indicated in block 318, the request may instead be a request to perform a write operation. Further, and as indicated in block 320, the request may be to write a logical column of data. Alternatively, the request may be to write a logical row of data, as indicated in block 322. In response to the request, the method 300 advances to block 324 in which the compute device 100 (e.g., the media access circuitry 108) determines whether to perform a write operation (e.g., whether a request to write data was received). If so, the method 300 advances to block 326 in which the compute device 100 (e.g., the media access circuitry 108) determines whether to write a row (e.g., a logical row of data) to the memory media 110 (e.g., whether the request was to write a logical row of data). If so, the method 300 advances to block 328 in which the compute device (e.g., the media access circuitry 108) writes a logical row of data to a target block (e.g., a set of tiles) of the memory media 110. A diagram 800 of an example rearrangement of data from the logical layout (e.g., the format of the data utilized by an application executing on the processor 102) to the physical layout in the tiles of the memory media 110 for a row writing operation is shown in FIG. 8. In performing the write of the logical row of data, the compute device 100 (e.g., the media access circuitry 108), in the illustrative embodiment, defines a target address for each tile as the target block address plus the row number (e.g., the logical row) that is to be written, as indicated in block 330. Additionally, in the illustrative embodiment, the compute device 100 (e.g., the media access circuitry 108) performs a bit-manipulation operation (e.g., a rotation, a reversal, an or, an xor, etc.) on the input data set defining the logical row of data to be written (e.g., a set of data designated in the request to be written as a logical row), as indicated in block 332. In the illustrative embodiment, in doing so, and as indicated in block 334, the compute device 100 (e.g., the media access circuitry 108) rotates the bit positions to the right by the row number (e.g., the number of the logical row that is to be written). To perform the rotation, in the illustrative embodiment, the compute device 100 (e.g., the media access circuitry 108) increments each bit position from the input data set by the row number. Further, after performing the bit-manipulation operation on the input data set, the compute device 100 (e.g., the media access circuitry 108) writes the bit-manipulated input data set using the target addresses for the tiles (e.g., the addresses defined in block 330), as indicated in block 338. Subsequently, the method 300 loops back to block 302 to potentially perform another memory access operation.

Figure 9:
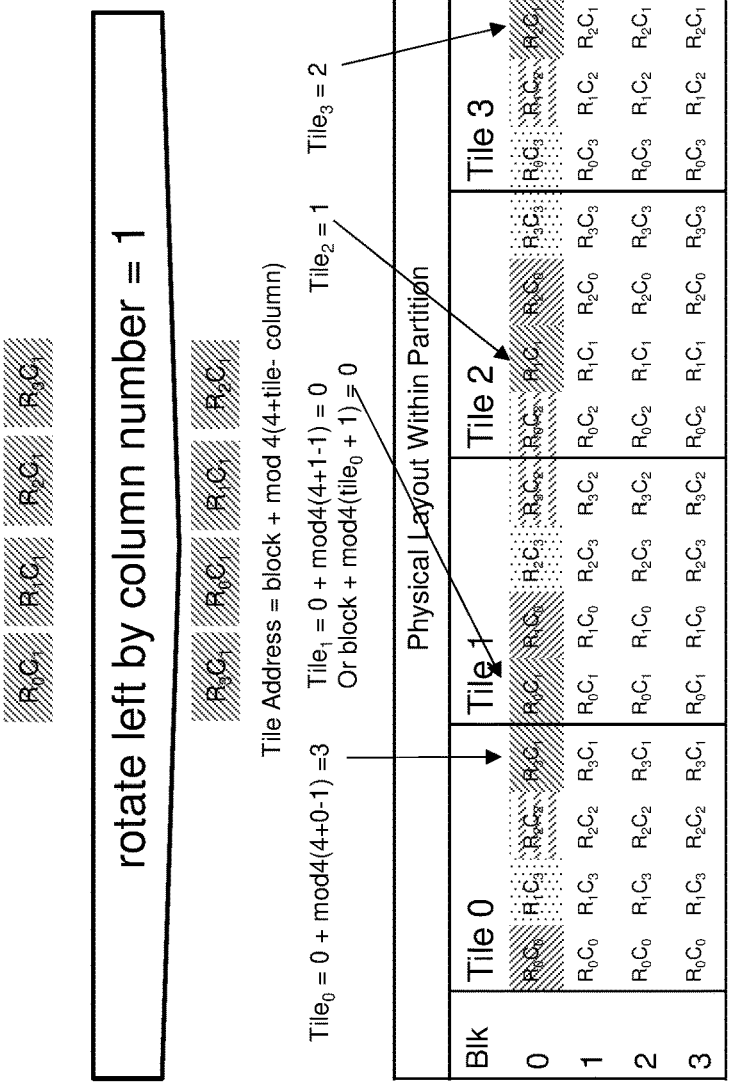
FIG. 9 is a simplified diagram of a rearrangement of data from a logical layout to a physical layout that may be performed by the compute device of FIG. 1 when writing a logical column of data.

Referring back to block 326, if the request is instead to write a logical column of data, the method 300 advances to block 340, in which the compute device 100 (e.g., the media access circuitry 108) writes a logical column of data to a target block (e.g., a set of tiles) of the memory media 110. A diagram 900 of an example rearrangement of data from the logical layout (e.g., the format of the data utilized by an application executing on the processor 102) to the physical layout in the tiles of the memory media 110 for a column writing operation is shown in FIG. 9. In doing so, and as indicated in block 342, the compute device 100 (e.g., the media access circuitry 108) defines a target base address as the target block address plus the column number (e.g., the number of the logical column) to be written. Additionally, in the illustrative embodiment, the compute device 100 (e.g., the media access circuitry 108) defines a target address for each tile as the target base address plus the total number of tiles in the target block (e.g., four) plus the present tile number (e.g., the tile for which an address is being defined) minus the column number, mod the total number of tiles in the target block (e.g., four), as indicated in block 344. Further, in the illustrative embodiment, the compute device 100 (e.g., the media access circuitry 108) rotates, to the left, bit positions in the input data set defining the logical column to be written, as indicated in block 346. In the illustrative embodiment, the compute device 100 (e.g., the media access circuitry 108) rotates the bit positions by the column number (e.g., if the column number is one, the media access circuitry 108 rotates the bits one position to the left). Additionally, the compute device 100 (e.g., the media access circuitry 108) writes the rotated input data set using the target addresses for the tiles (e.g., the addresses defined in block 346), as indicated in block 348. Subsequently, the method 300 loops back to block 302 to potentially perform another memory access operation. Referring back to block 324, if the compute device 100 instead received a request to perform a read operation, the method 300 advances to block 350 of FIG. 5 in which the compute device 100 determines whether to read a logical row.

Figure 5:
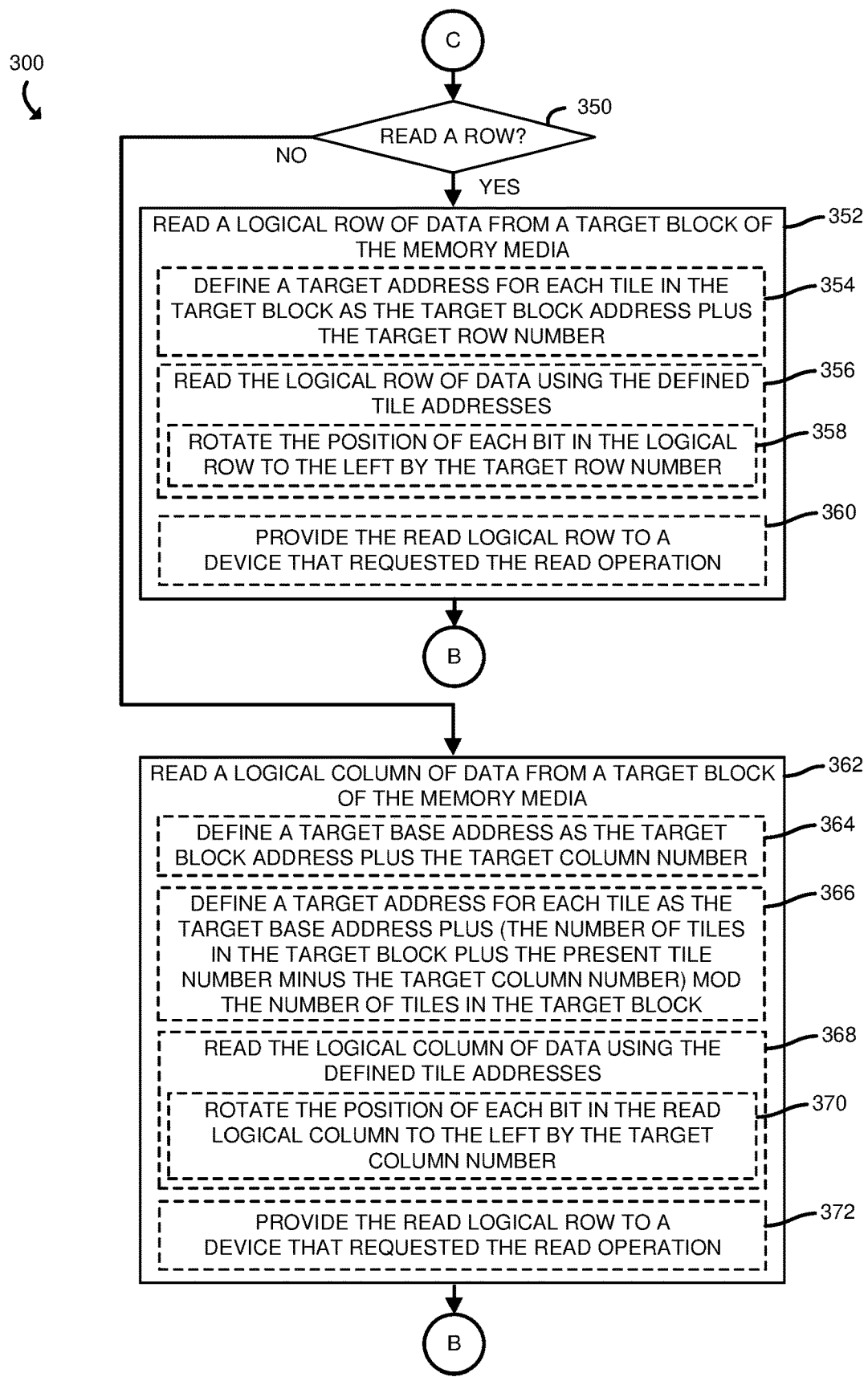
Figure 10:
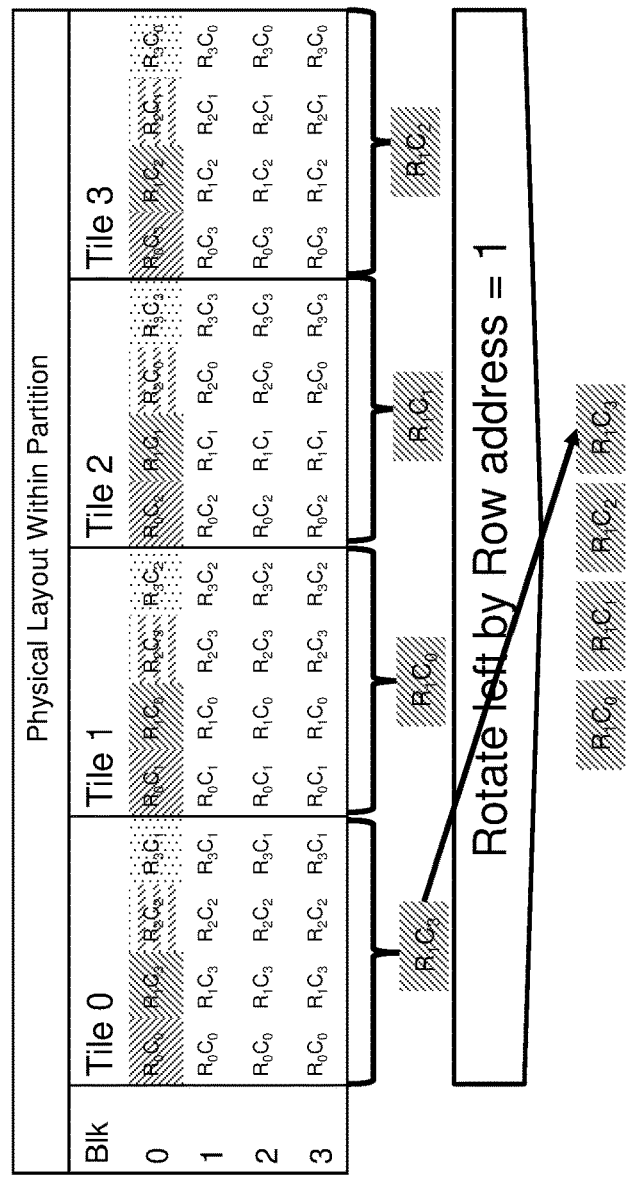
FIG. 10 is a simplified diagram of a rearrangement of data from a physical layout to a logical layout that may be performed by the compute device of FIG. 1 when reading a logical row of data.

Referring now to FIG. 5, if the compute device 100 (e.g., the media access circuitry 108) determines that a logical row of data is to be read (e.g., the request was to read a logical row of data), the method 300 advances to block 352, in which the compute device 100 (e.g., the media access circuitry 108) reads a logical row of data from a target block of the memory media 110. A diagram 1000 of an example rearrangement of data from the physical layout of the data in the tiles of the memory media 110 to the logical layout (e.g., the format used by an application executed by the processor 102) for a row read operation is shown in FIG. 10. In doing so, in the illustrative embodiment, the compute device 100 (e.g., the media access circuitry 108) defines a target address for each tile in the target block as the target block address plus the target row number (e.g., the number of the logical row to be read), as indicated in block 354. Further, as indicated in block 356, the compute device 100 (e.g., the media access circuitry 108) reads the logical row of data using the defined tile addresses (e.g., the addresses defined in block 354). In doing so, in the illustrative embodiment, the compute device 100 (e.g., the media access circuitry 108) rotates the position of each bit in the logical row to the left by the target row number, as indicated in block 358. Additionally, and as indicated in block 360, the compute device 100 (e.g., the media access circuitry 108) provides the read and rotated logical row of data to a device (e.g., to the processor 102 via the memory controller 106 and the I/O subsystem 112) that requested the read operation. Subsequently, the method 300 loops back to block 302 to potentially perform another memory access operation.

Figure 11:
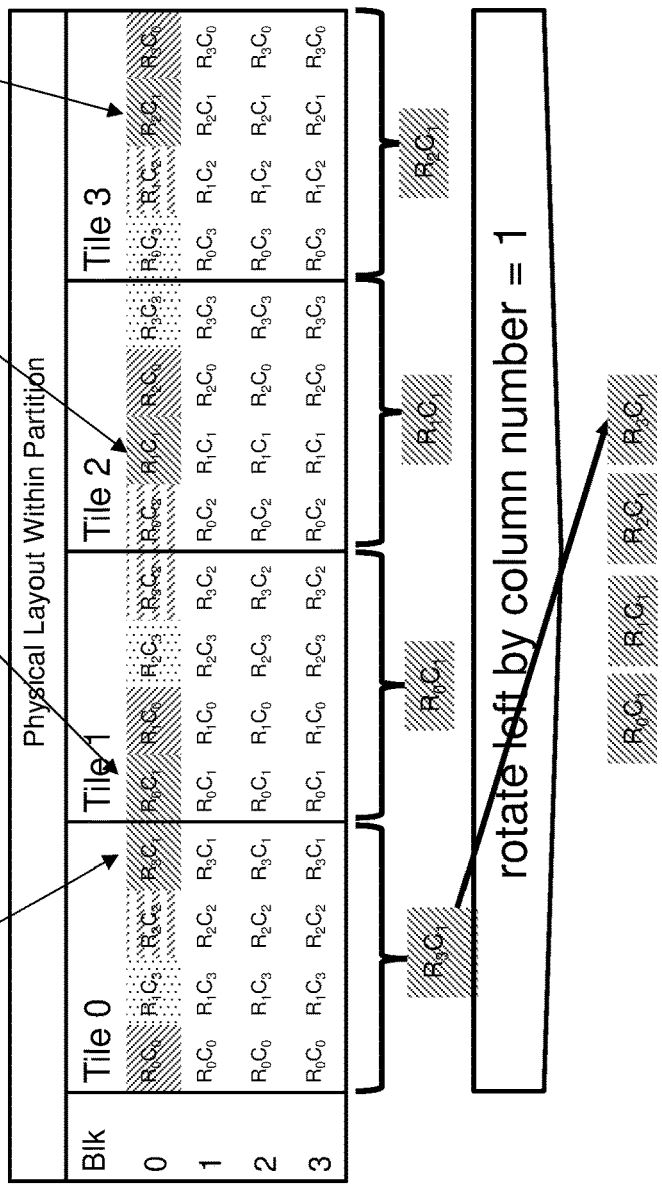
FIG. 11 is a simplified diagram of a rearrangement of data from a physical layout to a logical layout that may be performed by the compute device of FIG. 1 when reading a logical column of data.

Referring back to block 350, if the request was instead to read a logical column, the method 300 advances to block 362, in which the compute device 100 (e.g., the media access circuitry 108) reads a logical column from a target block of the memory media 110. A diagram 1100 of an example rearrangement of data from the physical layout of the data in the tiles of the memory media 110 to the logical layout (e.g., the format used by an application executed by the processor 102) for a column read operation is shown in FIG. 11. In performing the read operation, the compute device 100 (e.g., the media access circuitry 108), in the illustrative embodiment, defines a target base address as the target block address plus the target column number (e.g., the number of the logical column to be read), as indicated in block 364. Additionally, and as indicated in block 366, the compute device 100 (e.g., the media access circuitry 108) defines a target address for each tile. In doing so, the compute device 100 (e.g., the media access circuitry 108) defines the target address for each tile as the target base address (e.g., the base address defined in block 364) plus the number of tiles in the target block (e.g., four) plus the present tile number (e.g., the tile for which an address is being defined) minus the target column number, mod the number of tiles in the target block (e.g., four), as indicated in block 366. Additionally, as indicated in block 368, the compute device 100 (e.g., the media access circuitry 108) reads the logical column of data using the defined tile addresses (e.g., the addresses defined in block 366). In doing so, and as indicated in block 370, the compute device 100 (e.g., the media access circuitry 108) rotates the position of each bit in the read logical column to the left. In doing so, the compute device 100 (e.g., the media access circuitry 108) rotates each bit to the left by the target column number (e.g., if the target column number is one, then each bit is rotated to the left by one position). Additionally, and as indicated in block 372, the compute device 100 (e.g., the media access circuitry 108) provides the read and rotated logical row to a device (e.g., the processor 102, via the memory controller 106 and the I/O subsystem 112) that requested the read operation. Subsequently, the method 300 loops back to block 302 in which the compute device 100 may perform another memory access operation.

While, in the illustrative embodiment described above, logical columns are arranged diagonally across the physical rows and columns, it should be understood that other schemes of arranging or distributing the logical columns among the physical rows and columns are possible without departing from the spirit and scope of the disclosure.

EXAMPLES

Illustrative examples of the technologies disclosed herein are provided below. An embodiment of the technologies may include any one or more, and any combination of, the examples described below.

Example 1 includes a device comprising circuitry to receive a request to access memory in which each bit of a logical column of bits is located in a different physical row and a different physical column than any other bit in the logical column; and access, in response to the request, the memory, wherein to access the memory comprises to rotate one or more bit positions in a data set read from or written to the memory.

Example 2 includes the subject matter of Example 1, and wherein to receive the request comprises to receive a request to access memory in which logical columns are arranged diagonally across the physical rows and physical columns.

Example 3 includes the subject matter of any of Examples 1 and 2, and wherein to receive the request comprises to receive a request to access memory with a cross point architecture in which memory cells are positioned at intersections of word lines and bit lines, or at intersections in a cross point array structure, and are individually addressable.

Example 4 includes the subject matter of any of Examples 1-3, and wherein to receive the request comprises to receive a request to access memory with a three dimensional cross point architecture.

Example 5 includes the subject matter of any of Examples 1-4, and wherein to receive the request comprises to receive a request to write an input data set defining a logical row of data to be written to a target block of the memory and wherein to access the memory comprises to define a target address for each of multiple tiles as a target block address plus a row number indicative of an address of the logical row to be written; perform a bit-manipulation operation on the input data set, wherein the bit-manipulation operation includes at least one of a rotation, an or, an xor, or a reversal; and write the input data set to the memory using the target addresses for the tiles.

Example 6 includes the subject matter of any of Examples 1-5, and wherein to perform the bit-manipulation operation comprises to perform a rotation on bit positions within the input data set.

Example 7 includes the subject matter of any of Examples 1-6, and wherein to perform the rotation on the bit positions comprises to rotate the bit positions right by the row number.

Example 8 includes the subject matter of any of Examples 1-7, and wherein to receive the request comprises to receive a request to write an input data set defining a logical column of data to be written to a target block of the memory and wherein to access the memory comprises to define a target base address as a target block address plus a column number indicative of an address of the logical column to be written; define a target address for each of multiple tiles as the target base address plus the total number of tiles in the target block plus the present tile number minus the column number mod the total number of tiles in the target block; perform a rotation on bit positions in the input data set; and write the rotated input data set using the target addresses for the tiles.

Example 9 includes the subject matter of any of Examples 1-8, and wherein to perform a rotation on bit positions in the input data set comprises to rotate the bit positions left by the column number.

Example 10 includes the subject matter of any of Examples 1-9, and wherein to receive the request comprises to receive a request to read a data set defining a logical row of data to be read from a target block of the memory and wherein to access the memory comprises to define a target address for each of multiple tiles in the target block as a target block address plus a row number indicative of an address of the logical row to be read; and read the logical row as the data set using the target addresses for the tiles.

Example 11 includes the subject matter of any of Examples 1-10, and wherein the circuitry is further to rotate the position of each bit in the logical row to the left by the row number.

Example 12 includes the subject matter of any of Examples 1-11, and wherein to receive the request comprises to receive a request to read a data set defining a logical column of data to be read from a target block of the memory and wherein to access the memory comprises to define a target base address as a target block address plus a column number indicative of an address of the logical column to be read; define a target address for each of multiple tiles in the target block as the target base address plus the number of tiles in the target block plus the present tile number minus the column number mod the number of tiles in the target block; and read the logical column as the data set using the target addresses for the tiles.

Example 13 includes the subject matter of any of Examples 1-12, and wherein the circuitry is further to rotate the position each bit in the logical column to the left by the column number.

Example 14 includes a method comprising receiving, by a device, a request to access memory in which each bit of a logical column of bits is located in a different physical row and a different physical column than any other bit in the logical column; and accessing, by the device and in response to the request, the memory, wherein to access the memory comprises to rotate one or more bit positions in a data set read from or written to the memory.

Example 15 includes the subject matter of Example 14, and wherein receiving the request comprises receiving a request to access memory in which logical columns are arranged diagonally across the physical rows and physical columns and in which the memory has a cross point architecture.

Example 16 includes the subject matter of any of Examples 14 and 15, and wherein receiving the request comprises receiving a request to write an input data set defining a logical row of data to be written to a target block of the memory and wherein accessing the memory comprises defining a target address for each of multiple tiles as a target block address plus a row number indicative of an address of the logical row to be written; performing a bit-manipulation operation on the input data set, wherein the bit-manipulation operation includes at least one of a rotation, an or, an xor, or a reversal; and writing the input data set to the memory using the target addresses for the tiles.

Example 17 includes the subject matter of any of Examples 14-16, and wherein performing the bit manipulation comprises performing a rotation on bit positions within the input data set.

Example 18 includes the subject matter of any of Examples 14-17, and wherein receiving the request comprises receiving a request to write an input data set defining a logical column of data to be written to a target block of the memory and wherein accessing the memory comprises defining a target base address as a target block address plus a column number indicative of an address of the logical column to be written; defining a target address for each of multiple tiles as the target base address plus the total number of tiles in the target block plus the present tile number minus the column number mod the total number of tiles in the target block; performing a rotation on bit positions in the input data set; and writing the rotated input data set using the target addresses for the tiles.

Example 19 includes the subject matter of any of Examples 14-18, and wherein receiving the request comprises receiving a request to read a data set defining a logical row of data to be read from a target block of the memory and wherein accessing the memory comprises defining a target address for each of multiple tiles in the target block as a target block address plus a row number indicative of an address of the logical row to be read; and reading the logical row as the data set using the target addresses for the tiles.

Example 20 includes one or more machine-readable storage media comprising a plurality of instructions stored thereon that, in response to being executed, cause a device to receive a request to access memory in which each bit of a logical column of bits is located in a different physical row and a different physical column than any other bit in the logical column; and access, in response to the request, the memory, wherein to access the memory comprises to rotate one or more bit positions in a data set read from or written to the memory.

The invention claimed is:

1. A device comprising:
   circuitry to:
   receive a request to access a memory having individually addressable memory cells for storing data represented in any of a logical column and logical row of bits, in which each bit of any of the logical column and the logical row of bits is distributed across the individually addressable memory cells in a different physical row and a different physical column of the memory than any other bit in any of the logical column and the logical row of bits to prevent any distributed bit in any of a same physical row and a same physical column of the memory from being accessed in immediate succession; and
   define target addresses, in response to the request, for accessing one or more distributed bits of data in a target block of memory, including to:
   perform a bit-manipulation operation on a bit position of each bit of the data represented in any of the logical column and logical row of bits to determine the target block of memory containing the individually addressable memory cells across which each bit is distributed, and
   access the individually addressable memory cells using the defined target addresses to any of read and write the one or more distributed bits of data.

2. The device of claim 1, in which each bit of data represented in any of the logical column and the logical row of bits is distributed diagonally across different physical rows and different physical columns of the target block of memory to simplify mathematical operations for performing the bit-manipulation operation on the bit position of each bit of the data represented in any of the logical column and logical row of bits.

3. The device of claim 1, wherein the memory comprises a cross point architecture of memory cells in which the individually addressable memory cells are positioned at any of intersections of word lines and bit lines and intersections in a cross point array structure.

4. The device of claim 1, wherein the individually addressable memory cells across which each bit is distributed are located in multiple tiles of the target block of memory and wherein to access a determined target block of memory to write the data represented in the logical row of bits comprises to:
   define a target address for each of the multiple tiles as a target block address plus a row number indicative of an address of the logical row of bits to be written;
   perform the bit-manipulation operation on the bit position of each bit of the data represented in the logical row of bits, wherein the bit-manipulation operation includes at least one of a rotation, an or, an xor, or a reversal of the bit position based on the row number; and
   write the bits of data represented in the logical row of bits to the individually addressable memory cells based on the target address defined for each of the multiple tiles and manipulated bit positions.

5. The device of claim 4, wherein to perform the rotation on the bit position of each bit of the data represented in the logical row of bits comprises to increment the bit position of each bit in a same direction by the row number, the same direction including one of to the right and to the left.

6. The device of claim 1, wherein the individually addressable memory cells across which each bit is distributed are located in multiple tiles of the target block of memory and wherein to access a determined target block of memory to write the data represented in the logical column of bits comprises to:
   define a target base address as a target block address plus a column number indicative of an address of the logical column of bits to be written;
   define a target address for each of the multiple tiles as the target base address plus a total number of tiles in the target block plus a present tile number minus the column number, mod the total number of tiles in the target block;
   perform a rotation on the bit position of the bits of data represented in the logical column of bits; and
   write the bits of data represented in the logical column of bits to the individually addressable memory cells based on the target address defined for each of the multiple tiles and rotated bit positions.

7. The device of claim 6, wherein to perform the rotation on the bit positions comprises to increment the bit positions in a same direction by the column number, the same direction including one of to the right and to the left.

8. The device of claim 1, wherein to access the determined target block of memory to read the data represented in the logical row of bits comprises to:
   define a target address for each of multiple tiles in the target block of memory as a target block address plus a row number indicative of an address of the logical row of bits to be read; and
   read the logical row of bits as the data using the target address defined for each of the multiple tiles.

9. The device of claim 8, wherein to perform the bit-manipulation operation on the bit position of each bit of the data represented in the logical row of bits, the circuitry is further to perform a rotation on the bit position of each bit of the data represented in the logical row of bits, including to increment the bit position of each bit in a same direction by the row number, the same direction including one of to the right and to the left.

10. The device of claim 1, wherein to access the determined target block of memory to read the data represented in the logical column of bits comprises to:
   define a target base address as a target block address plus a column number indicative of an address of the logical column of bits to be read;
   define a target address for each of multiple tiles in the target block of memory as the target base address plus a total number of tiles in the target block of memory plus a present tile number of a tile in the multiple tiles minus the column number, mod the number of tiles in the target block of memory; and read the logical column as the data using the target addresses for the multiple tiles.

11. The device of claim 10, wherein to perform the bit-manipulation operation on the bit position of each bit of the data represented in the logical column of bits, the circuitry is further to perform a rotation on the bit position of each bit of the data represented in the logical column of bits, including to increment the bit position of each bit in a same direction by the column number, the same direction including one of to the right and to the left.

12. A method comprising:
receiving, by a device, a request to access a memory having individually addressable memory cells for storing data represented in any of a logical column and logical row of bits, in which each bit of any of the logical column and the logical row of bits is distributed across the individually addressable memory cells in a different physical row and a different physical column of the memory than any other bit in any of the logical column and the logical row of bits to prevent any distributed bit in any of a same physical row and same physical column of the memory from being accessed in immediate succession; and
defining target addresses, by the device and in response to the request, for accessing one or more distributed bits of data in a target block of memory, including:
performing a bit-manipulation operation on a bit position of each bit of the data represented in any of the logical column and logical row of bits to determine the target block of memory containing the individually addressable memory cells across which each bit is distributed, and
accessing the individually addressable memory cells using the defined target addresses to any of read and write the one or more distributed bits of data.

13. The method of claim 12, in which:
each bit of data represented in any of the logical column and the logical row of bits is distributed diagonally across different physical rows and different physical columns of the target block memory to simplify mathematical operations for performing the bit-manipulation operation on the bit position of each bit of the data represented in any of the logical column and logical row of bits; and
the memory has a cross point architecture.

14. The method of claim 12, wherein the individually addressable memory cells across which each bit is distributed are located in multiple tiles of the target block of memory, and wherein accessing a determined target block of memory to write the data represented in the logical row of bits comprises:
defining a target address for each of the multiple tiles as a target block address of the target block of the memory plus a row number indicative of an address of the logical row of bits to be written;
performing the bit-manipulation operation on the bit position of each bit of the data represented in the logical row of bits, wherein the bit-manipulation operation includes at least one of a rotation, an or, an xor, or a reversal of the bit position based on the row number; and
writing the bits of data represented in the logical row of bits to the individually addressable memory cells based on the target address defined for each of the multiple tiles and manipulated bit positions.

15. The method of claim 14, wherein performing the bit manipulation comprises performing a rotation on bit position of each bit of the data represented in the logical row of bits comprises incrementing the bit position of each bit in a same direction by the row number, the same direction including one of to the right and to the left.

16. The method of claim 12, wherein the individually addressable memory cells across which each bit is distributed are located in multiple tiles of the target block of memory and wherein accessing a determined target block of memory to write the data represented in the logical column of bits comprises:
defining a target base address as a target block address of the target block of memory plus a column number indicative of an address of the logical column of bits to be written;
defining a target address for each of the multiple tiles as the target base address plus a total number of tiles in the target block plus a present tile number of a tile in the multiple tiles minus the column number, mod the total number of tiles in the target block;
performing a rotation on the bit position of the bits of data represented in the logical column of bits; and
writing the bits of data represented in the logical column of bits to the individually addressable memory cells based on the target address defined for each of the multiple tiles and rotated bit positions.

17. The method of claim 12, wherein the individually addressable memory cells across which each bit is distributed are located in multiple tiles of the target block of the memory, and wherein accessing a determined target block memory to read the data represented in the logical row of bits comprises:
defining a target address for each of multiple tiles in the target block of memory as a target block address plus a row number indicative of an address of the logical row of bits to be read; and
reading the logical row of bits as the data using the target address defined for each of the multiple tiles.

18. One or more machine-readable storage media comprising a plurality of instructions stored thereon that, in response to being executed, cause a device to:
receive a request to access memory having individually addressable memory cells for storing data represented in any of a logical column and logical row of bits, in which each bit of any of the logical column and the logical row of bits is distributed across the individually addressable memory cells in a different physical row and a different physical column of the memory than any other bit in any of the logical column and the logical row of bits to prevent any distributed bit in any of a same physical row and a same physical column of the memory from being accessed in immediate succession; and
defining target addresses, in response to the request, for accessing one or more distributed bits of data in a target block of the memory, including to:
perform a bit-manipulation operation on a bit position of each bit of the data represented in any of the logical column and logical row of bits to determine the target block of memory containing the individually addressable memory cells across which each bit is distributed, and
access the individually addressable memory cells using the defined target addresses to any of read and write the one or more distributed bits of data.

* * * * *